Patented Sept. 7, 1926.

1,598,883

UNITED STATES PATENT OFFICE.

LENA B. SACKETT, OF WINTERS, CALIFORNIA.

METHOD OF PROCESSING PRUNES.

No Drawing. Application filed December 8, 1925. Serial No. 74,191.

This invention relates to a treatment of dried prunes, the object of the invention being to provide a method of processing the prunes whereby after having been treated with my improved process they can thereafter be cooked soft in about sixty minutes cooking without the necessity of soaking them over-night in water, or cooking them for an inordinate length of time as is necessary in connection with dried prunes processed under present-day methods.

A dried prune has a very tough skin which under ordinary conditions renders it necessary to soak and cook it a long time before it becomes tender. This is an objectionable feature which lessens the possible consumption of this fruit, and I believe that by processing the same according to my improved method that the use of this fruit will become more popular and thus increase its consumption. Packers of this fruit have for a long time been looking for some process or method by which the necessary soaking and cooking can be minimized, but to date they have been unable to accomplish their objective in this regard, but I feel that my improved method fully solves the problem.

In carrying out my improved method of processing the prunes I add to thirty-two parts of boiling water by volume one part of vinegar and add as many of the dried prunes as the water will cover and cook the same eight minutes. I then drain, dry and pack the same.

This short period of cooking with the vinegar added to the water causes the vinegar to penetrate the tough skins of the prunes and render them very tender. Then when they are to be later cooked I find that they can be fully cooked to the desired soft and tender condition in approximately sixty minutes of cooking or less without the necessity of soaking the prunes over-night or cooking them an inordinately long time as is now commonly necessary with the present method of processing the dried prunes.

If it is desired to use the prunes as a confection, as is often done, some people enjoying eating them raw, while the same are being processed as above there can be added one part of white karo syrup or the like to the thirty-two parts of boiling water, and then when the prunes are drained, dried and packed they will have sufficient sweetness to make them a very delightful confection.

The above is substantially the proportions of the different ingredients to be used in carrying out my improved method of processing the prunes, but in practice it may be found that slight deviations therefrom may be resorted to without departing from the spirit of the invention.

Having thus described my improved method what I claim as new and useful and desire to secure by Letters Patent is:—

1. The herein described method of processing dried prunes consisting in boiling the dried prunes for a short period of time in water to which has been added vinegar, and then draining and drying the same.

2. The herein described method of processing dried prunes consisting in boiling the dried prunes for a short period of time in water to which has been added vinegar and syrup, and then draining and drying the same.

3. The herein described method of processing dried prunes consisting in boiling the same in water to which has been added approximately one part of vinegar to thirty-two parts of water, and then draining and drying the same.

4. The herein described method of processing dried prunes consisting in adding one part of vinegar to thirty-two parts of water, bringing the same to a boiling point, submerging the prunes therein, boiling the prunes approximately eight minutes, then draining and drying the same.

In testimony whereof I affix my signature.

LENA B. SACKETT.